United States Patent
Yi et al.

(10) Patent No.: US 9,380,521 B2
(45) Date of Patent: Jun. 28, 2016

(54) METHOD FOR CELL SELECTION FOR NARROWBAND TERMINAL AND APPARATUS USING SAME

(71) Applicant: LG ELECTRONICS INC., Seoul (KR)

(72) Inventors: Yunjung Yi, Anyang-si (KR); Joonkui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/383,730

(22) PCT Filed: Mar. 11, 2013

(86) PCT No.: PCT/KR2013/001940
§ 371 (c)(1),
(2) Date: Sep. 8, 2014

(87) PCT Pub. No.: WO2013/133681
PCT Pub. Date: Sep. 12, 2013

(65) Prior Publication Data
US 2015/0024744 A1    Jan. 22, 2015

Related U.S. Application Data

(60) Provisional application No. 61/608,654, filed on Mar. 9, 2012.

(51) Int. Cl.
*H04W 48/16* (2009.01)
*H04W 48/20* (2009.01)
*H04W 4/00* (2009.01)

(52) U.S. Cl.
CPC .............. *H04W 48/16* (2013.01); *H04W 4/005* (2013.01); *H04W 48/20* (2013.01)

(58) Field of Classification Search
CPC .............. H04J 11/0069; H04J 11/0053; H04J 11/0073; H04J 13/0062; H04W 24/02; H04W 24/10; H04W 48/12; H04W 48/16; H04W 4/005; H04W 72/085; H04W 36/0083; H04W 72/042; H04W 72/0453; H04W 88/08; H04W 48/20
USPC ............. 455/67.11, 509, 513, 561, 95, 115.3, 455/166.2, 422.1, 435.2, 452.1, 452.2, 525, 455/434, 115.2; 370/252, 331, 319, 328, 370/329, 330, 338, 343, 344, 350, 400, 466, 370/469, 478, 482, 485, 250
See application file for complete search history.

(56) References Cited

U.S. PATENT DOCUMENTS

2005/0233715 A1    10/2005    Laroia et al.
2008/0080476 A1    4/2008     Cho et al.
(Continued)

FOREIGN PATENT DOCUMENTS

KR    10-2006-0133108 A    12/2006
KR    10-0943619 A          2/2010

OTHER PUBLICATIONS

Ericsson et al., "Standards aspects impacting MTC LTE UE costs", 3GPP TSG-RAN WG1 Meeting #67, R1-113683, San Francisco, Nov. 14-18, 2011, 3 pages.

*Primary Examiner* — Inder Mehra
(74) *Attorney, Agent, or Firm* — Birch, Stewart, Kolasch & Birch, LLP

(57) ABSTRACT

Provided are a method for cell selection for a narrowband terminal and an apparatus using same. A narrowband terminal receives a wireless frame comprising a first synchronous signal for a user equipment supporting a first bandwidth, and a second synchronous signal for a user equipment supporting a second bandwidth which is narrower than the first bandwidth. The narrowband terminal searches at least one neighboring cell on the basis of the second synchronous signal. The narrowband terminal selects at least one cell from among one or more neighboring cells.

13 Claims, 7 Drawing Sheets

(56) References Cited

U.S. PATENT DOCUMENTS

| | | | |
|---|---|---|---|
| 2009/0086713 A1* | 4/2009 | Luo | H04J 11/0073 370/350 |
| 2010/0298031 A1* | 11/2010 | Han | H04L 27/2614 455/561 |
| 2012/0088535 A1* | 4/2012 | Wang | H04B 7/024 455/513 |
| 2012/0149429 A1* | 6/2012 | Martin | H04W 36/0083 455/525 |
| 2012/0320773 A1* | 12/2012 | Toufik | H04B 17/382 370/252 |
| 2013/0121309 A1* | 5/2013 | Guo | H04W 4/005 370/331 |
| 2015/0195720 A1* | 7/2015 | Ekici | H04W 24/02 455/67.11 |

\* cited by examiner

METHOD FOR CELL SELECTION FOR NARROWBAND TERMINAL AND APPARATUS USING SAME

CROSS REFERENCE TO RELATED APPLICATIONS

This application is the National Phase of PCT/KR2013/001940 filed on Mar. 11, 2013, which claims priority under 35 U.S.C. 119(e) to U.S. Provisional Application No. 61/608,654 filed on Mar. 9, 2012, all of which are incorporated by reference herein in its entirety.

BACKGROUND OF THE INVENTION

1. Field of the Invention

The present invention relates to wireless communication and, more particularly, to a method for cell selection of a narrowband terminal and an apparatus using the same.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A next system of an LTE-A has considered to configure a user equipment at a low cost/low specification mainly focused on data communication such as metering of a gauge meter, measurement of a water level, utilization of a monitoring camera, inventory report of a vending machine, and the like. Such a user equipment is referred to as a 'Machine Type Communication (MTC) device' for the purpose of convenience. In the MTC, a transmission size of data is small and data are sometimes transmitted/received. Accordingly, it is preferable to reduce a cost of the device and battery consumption using characteristics of the MTC. For example, a narrow operation frequency bandwidth may be configured in order to reduce complexity of a radio frequency (RF) unit in the MTC device.

Cell search and selection process in an LTE system and an LTE-A system are performed on the basis of Primary Synchronization Signal (PSS)/Secondary Synchronization Signal (SSS) and random access. Existing cell search and selection process defined in the LTE system and the LTE-A system are performed based on a normal terminal. There is a need to newly define cell search and selection process of an MTC device which is expected to be operated at a relatively narrow band as compared with that of an existing terminal.

SUMMARY OF THE INVENTION

The present invention provides a method for cell search for a narrowband terminal, and a terminal operating at a region with limited coverage, and an apparatus using the method.

The present invention also provides a method for cell selection for a narrowband terminal, and a terminal operating at a region with limited coverage, and an apparatus using the method.

According to the embodiment of the present invention, there is provided a method for cell selection for a narrowband terminal in a wireless communication system. The method may comprise: receiving a radio frame including a first synchronous signal for a user equipment supporting a first bandwidth, and a second synchronous signal for a user equipment supporting a second bandwidth which is narrower than the first bandwidth; searching at least one neighboring cell on the basis of the second synchronous signal; and selecting at least one cell from one or more neighboring cells.

According to another embodiment of the present invention, there is provided a user equipment in a wireless communication system. The user equipment may comprise: a radio frequency (RF) to transmit and receive a wireless signal; and a processor connected to the RF unit, wherein the processor receives a radio frame including a first synchronous signal for a user equipment supporting a first bandwidth, and a second synchronous signal for a user equipment supporting a second bandwidth which is narrower than the first bandwidth, searches at least one neighboring cell on the basis of the second synchronous signal, and selects at least one cell from one or more neighboring cells.

The user equipment supporting the second bandwidth may comprise a machine type communication (MTC) device.

The second synchronous signal may comprise information on the second bandwidth.

the first synchronous signal may be generated from a Zadoff-Chu (ZC) sequence having a root index of 25, 29, or 34, and the second synchronous signal may be generated from the ZC sequence having the root index of 38

The second synchronous signal may be transmitted from a sub-frame for machine type communication (MTC).

The first synchronous signal may be transmitted in a period of 5 ms and the second synchronous signal may be transmitted in a period of 10 ms.

The one cell may be a cell having a first detected cell having a signal strength greater than a predetermined threshold value among the at least one neighboring cell.

A narrowband terminal having a low specification, an MTC device, and a terminal operating at a region with limited coverage can efficiently perform cell search and selection.

DESCRIPTION OF EXEMPLARY EMBODIMENTS

Following technologies may be used in various wireless communication systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by a radio technology such as UTRA (universal terrestrial radio access) or CDMA 2000. The TDMA may be implemented by the radio technology such as GSM (global system for mobile communications)/GPRS (general packet radio service)/EDGE (enhanced data rates for GSM evolution). The OFDMA may be implemented by the radio technology such as IEEE (institute of electrical and electronics engineers) 802.11(Wi-Fi), IEEE 802.16 (WiMAX), IEEE 802-20, and E-UTRA(evolved UTRA). IEEE 802.16m is evolution of an IEEE 802.16e, and provides backward compatibility with a system based on the IEEE 802.16e. The UTRA is a part of an UMTS (universal mobile telecommunications system). 3GPP (3rd generation partnership project) LTE (long term evolution) is a part of an E-UMTS (evolved UMTS) using E-UTRA (evolved-UMTS terrestrial radio access), adopts OFDMA in downlink and adopts SC-FDMA in downlink. The LTE-A (advanced) is evolution of the 3GPP LTE.

A user equipment (UE) may be fixed and may have mobility, and may be referred to as other terms such as MS (mobile station), MT (mobile terminal), UT (user terminal), SS (subscriber station), wireless device, PDA (personal digital assistant, wireless modem, and handheld device.

In general, a base station (BS) refers to a fixed station communicating with the UE, and may be referred to as other terms such as eNB (evolved-NodeB), BTS (base transceiver system), and access point (AP).

The following description will be made where the present invention is applied to 3GPP LTE based on 3GPP release 8. This is illustrative purpose only and the present invention is applicable to various wireless communication networks. Hereinafter, the LTE includes LTE and/or LTE-A.

Figure 1:
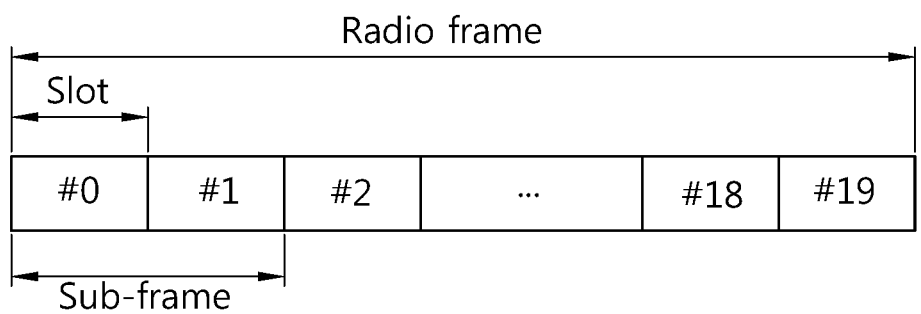
FIG. 1 illustrates a structure of a radio frame in a 3GPP LTE.

FIG. 1 illustrates a structure of a radio frame in a 3GPP LTE.

This may refer to a third section of 3GPP (3rd Generation Partnership Project) TS 36.211 V10.3.0 (2011-09) "Technical Specification Group Radio Access Network; Evolved Universal Terrestrial Radio Access (E-UTRA); Physical channels and modulation (Release 10)".

Referring to FIG. 1, the radio frame includes ten sub-frames. One sub-frame includes two continuous slots. The slots in the radio frame are marked with slot numbers of #0 to #19. A time required to transmit one sub-frame refers to a transmission time interval (TTI). The TTI may refer to a scheduling unit to transmit data. For example, a length of one radio frame may be 10 ms, a length of one sub-frame may be 1 ms, and a length of one slot may be 0.5 ms.

The one slot includes a plurality of orthogonal frequency division multiplexing (OFDM) symbols at a time domain, and a plurality of sub-carriers at a frequency domain. Since the 3GPP LTE uses an OFDMA at downlink, the OFDM symbol is used to represent one symbol period, and may be called another name according to a multiple access scheme. For example, when an SC-FDMA is used in an uplink multiple access scheme, the OFDM symbol may refer to an SC-FDMA symbol. A resource block (RB) includes a plurality continuous sub-carriers in one slot in a resource allocation unit.

The radio frame of FIG. 1 is illustrative purpose only. Accordingly, the number of sub-frames included in the radio frame, the number of slots included in the sub-frame, or the number of OFDM symbols included in the slot may be variously changed. The 3GPP LTE defines that one slot at normal cyclic prefix (CP) includes 7 OFDM symbols, and one slot at an extended CP includes six OFDM symbols.

Figure 2:
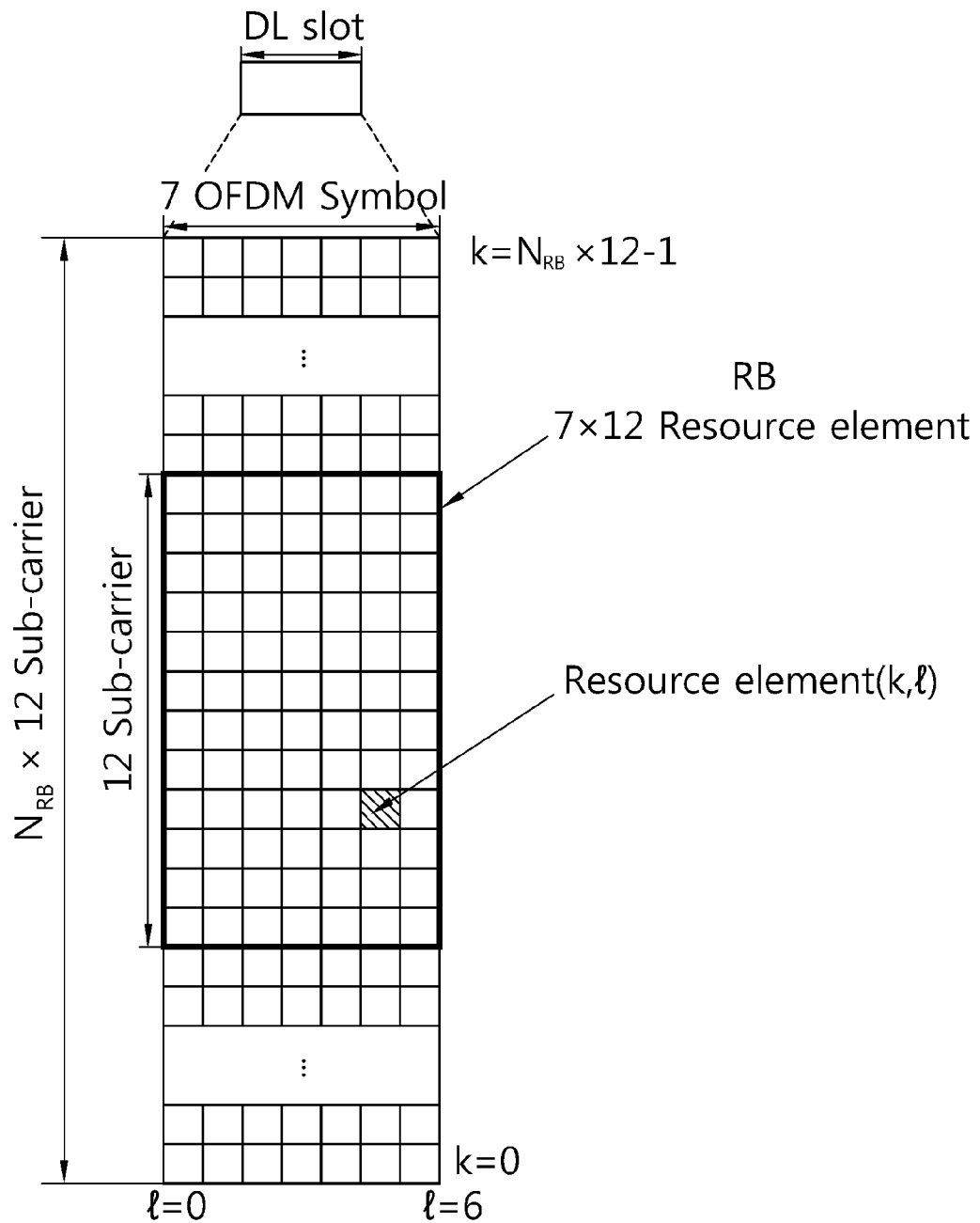
FIG. 2 illustrates an example of a resource grid with respect to one downlink slot.

FIG. 2 illustrates an example of a resource grid with respect to one downlink slot.

The downlink slot includes a plurality of OFDM symbols at a time domain, and includes NRB resource blocks at a frequency domain. The number NRB of the resource blocks included in the downlink slot depends on a downlink transmission bandwidth configured in a cell. For example, the NRB may be one of 6 to 110 in the LTE system. One resource block includes a plurality of sub-carriers at a frequency domain. A structure of an uplink slot may be equal to the structure of downlink slot.

Each element in the resource grid refers to a resource element (hereinafter referred to as 'RE'). The RE in the resource grid may be identified by an index pair (k,l) in a slot. In this case, k (k=0, . . . , NRB×12-1) represents a sub-carrier index in the frequency domain and l (l=0, . . . , 6) represents an OFDM symbol index in the time domain.

In this case, although the above embodiment has described that one resource block includes 7×12 resource elements composed of 7 OFDM symbols at the time domain and 12 sub-carriers at the frequency domain, but the number of OFDM symbols and the number of sub-carriers in the resource block. The number of OFDM symbols and the number of sub-carriers may be variously changed according to a length of a CP and a frequency spacing.

Figure 3:
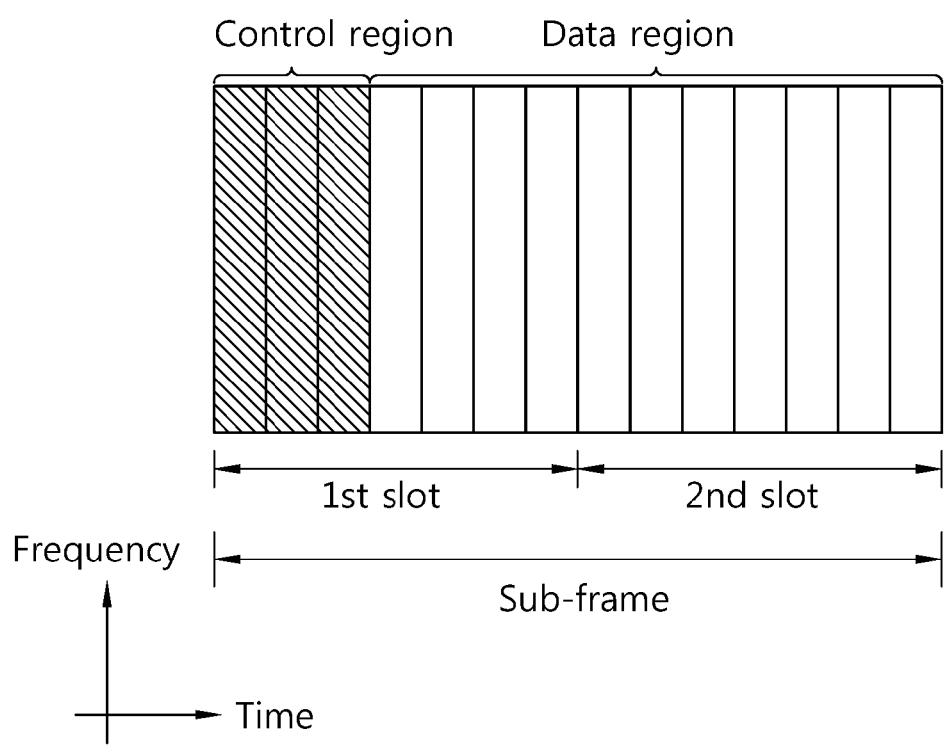
FIG. 3 illustrates a structure of a downlink sub-frame.

FIG. 3 illustrates a structure of a downlink sub-frame.

The downlink (DL) sub-frame is divided into a control region and a data region at the time domain. The control region includes maximum three OFDM symbols prior to a first slot in the sub-frame, but the number of OFDM symbols included in the control region may be changed. A Physical Downlink Control Channel (PDCCH) and another control channel are allocated to the control region, and a PDSCH is allocated to the data region.

Control information transmitted through the PDCCH refers to downlink control information (DCI). The DCI may include resource allocation of the PDSCH (may refer to DL grant), resource allocation of the PUSCH (may refer to UL (uplink) grant), and an aggregation of a transmission power control command and activation of a Voice over Internet Protocol (VoIP) with respect to separate UEs in a predetermined UE group.

The base station determines a PDCCH format according to a DCI to be sent to the UE to attach a Cyclic Redundancy Check (CRC) to the DCI, and masks a unique identification (refers to a Radio Network Temporary Identifier (RNTI)) according to an owner or application of the PDCCH.

When the PDCCH is used for a specific terminal, the unique identification of the terminal, for example, a Cell-RNTI (C-RNTI) may be masked to a CRC. Alternatively, when the PDCCH is used for a paging message, a paging indication identification, for example, a Paging-RNTI (P-RNTI) may be marked to the CRC. When the PDCCH is used for system information, system information identification and a system information-RNTI (SI-RNTI) may be marked to the CRC. In order to indicate a random access response being a response to transmission of a random access preamble, a random access-RNTI (RA-RNTI) may be marked to the CRC. In order to indicate a transmit power control (TPC) command with respect to a plurality of terminals, a TPC-RNTI may be marked to the CRC.

The control region in the sub-frame includes a plurality of control channel elements (CCEs). The CCE is a logical allocation unit used to provide a coding rate according to a state of a wireless channel to the PDCCH, and corresponds to a plurality of resource element groups (REGs). The REG includes a plurality of resource elements. A format of the PDCCH and the possible bit number of the PDCCH are determined according to the relationship between the number of the CCEs and a coding rate provided to the CCEs.

One REG includes four REs and one CCE include nine REGs. In order to configure one PDCCH, {1, 2, 4, 8} CCEs may be used, and an element of each of the {1, 2, 4, 8} CCEs refers to a CCE aggregation level.

The base station determines the number of the CCEs to transmit the PDCCH according to a channel state. For example, one CCE is used in a terminal having an excellent downlink channel state to transmit the PDCCH. Eight CCEs are used in a terminal having a poor downlink channel state to transmit the PDCCH.

A control channel configured by at least one CCE performs interleaving of an REG unit, and is mapped to a physical resource after cyclic shift based on a cell identifier (ID) is performed.

Figure 4:
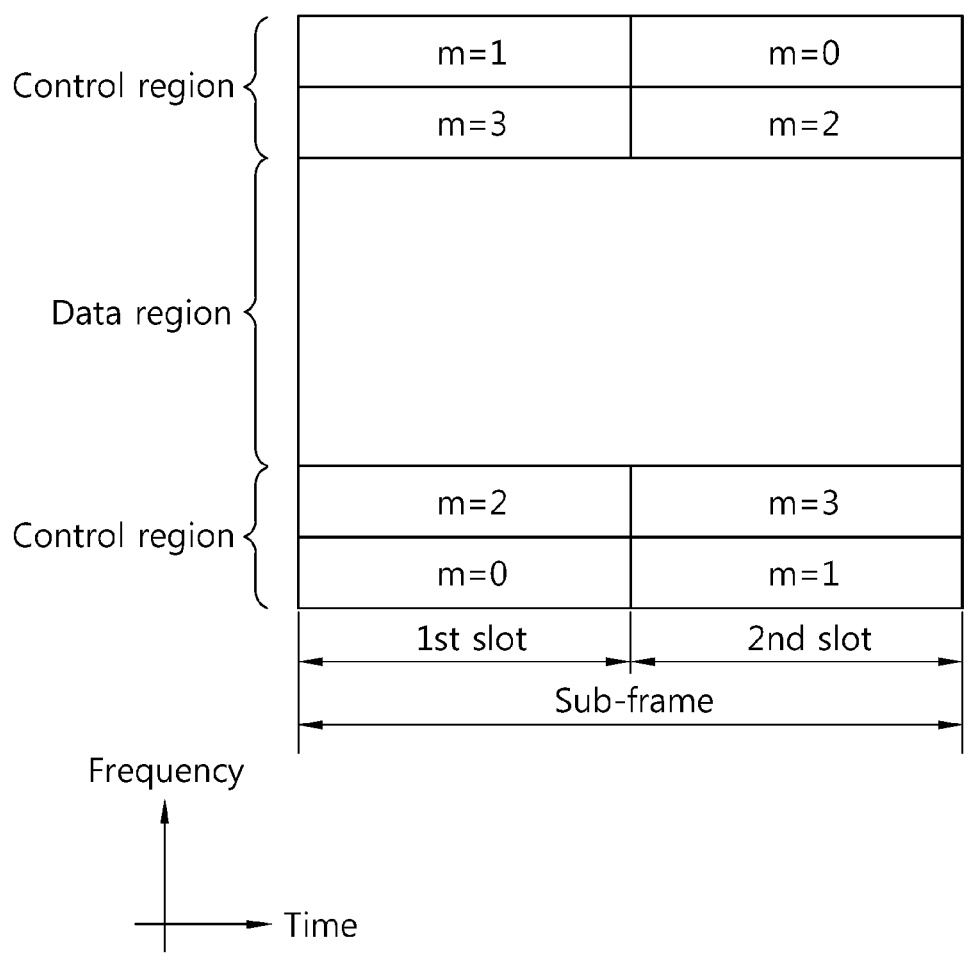
FIG. 4 illustrates a structure of an uplink sub-frame.

FIG. 4 illustrates a structure of an uplink sub-frame.

The uplink sub-frame is divided into a control region and a data region at the frequency domain. A physical uplink control channel (PUCCH) is allocated to the control region. In this case, uplink control information is transmitted to the PUCCH. A physical uplink shared channel (PUSCH) is allocated to the data region. Data are transmitted to the PUSCH.

The PUCCH with respect to one terminal is allocated to the sub-frame as a resource block (RB) pair. Resource blocks included in the RB pair occupy different sub-carriers at a first slot and a second slot, respectively. A frequency of resource blocks included in the RB pair allocated to the PUCCH varies based on a slot boundary. This means that a RB pair allocated to the PUCCH is frequency-hopped at the slot boundary. The terminal may obtain a frequency diversity gain by transmitting uplink control information through different sub-carriers according to a time. An m is a position index representing a logical frequency domain position of a RB pair allocated to the PUCCH in the sub-frame.

The uplink control information transmitted to the PUCCH includes a hybrid automatic repeat request (HARQ) acknowledgement (ACK), a channel quality indicator (CQI) indicating a downlink channel state, and a scheduling request (SR) being an uplink wireless resource allocation request.

Meanwhile, according to a current LTE specification, it is set that all terminals support a system bandwidth of maximum 20 MHz. That is, the LTE terminal is required to represent baseband processing capability to support 20 MHz bandwidth. However, in order to reduce a hardware cost of the terminal and battery consumption, an approach for reducing a bandwidth supported from the terminal may be considered.

Machine type communication (MTC) is a type of data communication including one entity which does not require interaction of a person. That is, the MTC means a concept where a machine device instead of a terminal of the person communicates through a network. The machine device used for the MTX refers to an MTC device. In a case of the MTC device, since data to be transmitted has a small size and data are sometimes transmitted and received, the MTC device may strongly support a bandwidth narrower than a support bandwidth of a normal terminal having 20 MHz.

In the LTE system and the LTE-A system, the terminal searches neighbor cells based on Primary Synchronization Signal (PSS)/Secondary Synchronization Signal (SSS) and random access, and select at least one of the searched cells based on strength and quality of a received signal expressed by parameters such as reference signal received power (RSRP) and reference signal received quality (RSRQ). Existing cell search and selection (or reselection) process defined in the LTE system and the LTE-A system are performed based on the terminal, and are repeated until a cell supporting a system bandwidth suitable for capability of the terminal is found.

Although it is ideal that the MTC device performs the same cell search and selection (reselection) mechanism, since the selected cell may has a system bandwidth wider than a system bandwidth supported from the MTC device, it is inefficient to equally perform the existing cell search and selection (reselection) process. Further, since the MTC device restrictively uses a battery, when power of the MTC device is turned-on or the MTC device is restored in a saving mode, it is important that the MTC device accesses a network by consuming minimum energy. Accordingly, there is a need to newly define cell search and selection (reselection) process for the MTC device.

Although the foregoing description was made while focusing on the MTC device for the purpose of convenience, those skilled in the art may apply the scope of the present invention to a normal terminal. For example, the scope of the present invention is applicable to a terminal having a low specification such as a narrowband terminal having a bandwidth transmitting data narrower than that of the normal terminal or a terminal operating at a region with limited coverage.

Figure 5:
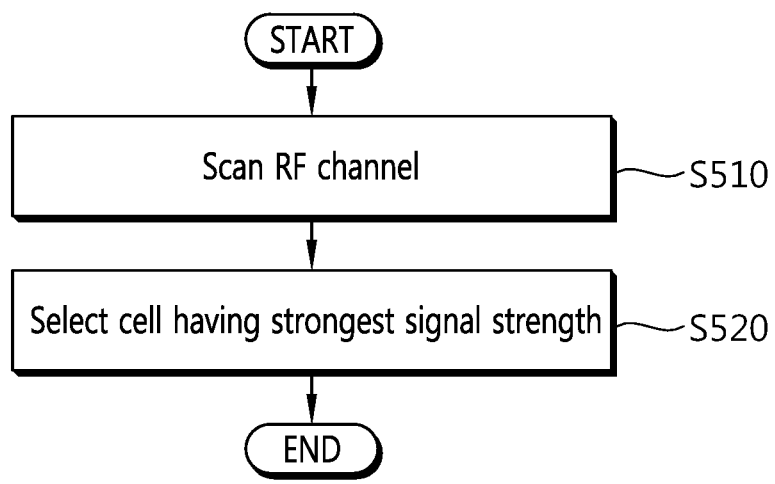
FIG. 5 illustrates an example of initial cell selection.

FIG. 5 illustrates an example of initial cell selection.

When there is no channel information on whether an RF channel is an LTE (or E-UTRA) carrier, the terminal scans all RF channels of a LTE (or E-UTRA) band in order to find a location of a suitable cell (S510).

The terminal identifies and selects a cell having a strongest signal strength based on a received quality (S520).

Meanwhile, it is expected that the MTC device may support only a pre-configured band before deployment. Accordingly, cell search by the MTC device may be limited to only bands supported from a corresponding device. An initial cell selection process may be changed as follows.

The initial cell selection process does not require information on whether an RF channel is a LTE (or E-UTRA) carrier. The MTC device scans a supportable RF channel from a LTE (or E-UTRA) band in order to search a location of a suitable cell. If one suitable cell is searched, the MTC device selects a corresponding cell and terminates the initial cell selection process.

In the same manner as in the initial cell selection process, in the cell reselection process, the MTC device scans a supportable RF channel from an LTE (or E-UTRA) band in order to search a location of a suitable cell. If one suitable cell is searched, the MTC device may select a corresponding cell.

Meanwhile, there may be a plurality of cells having different system bandwidths at a single band. Accordingly, it is preferable that the MTC device confirms a system bandwidth of each cell in the initial cell selection process and the cell reselection process. Otherwise, the cell selection may be repeated to may consume power of the MTC device.

<Method 1: Stores an ID of a Cell Supporting the MTC Device>

According to the embodiment of the present invention, the MTC device stores an ID of a narrowband cell, and performs the initial cell selection and/or the cell reselection based on the ID of the narrowband cell. That is, the MTC device may store and use an ID of a closed subscriber group (CSG) cell, and may store and use an ID of a narrowband cell having a system bandwidth supported from the MTC device.

For example, the MTC device may search only cells having IDs included in a pre-configured narrowband cell list when power is turned-on or the MTC device is restored in a saving mode. It may be assumed that at least one narrowband is supported from a wireless communication system including the MTC device, and the narrowband is equal to a bandwidth supported from the MTC device. The MTC device may have a narrowband cell list including IDs of cells having a system bandwidth equal to bandwidth capacity of the MTC device.

Since the performing number of the cell searches is limited to the number of cells knowing a cell ID, the above <method 1> is preferable to the MTC device suing a limited battery. Further, the number of hypotheses with respect to PSS/SSS and detection overhead may be reduced.

<Method 2: Performs Cell Selection After Reading PBCH>

According to another embodiment of the present invention, the MTC device reads a PBCH to perform initial cell selection and/or cell reselection. A master information block (MIB) transmitted through the PBCH may include information on a system bandwidth. Accordingly, the MTC device may read the PBCH to perform cell selection based on information on the system bandwidth. For example, the MTC device may select a cell having the strongest signal strength from cells having a system bandwidth equal to bandwidth capacity of the MTC device.

Although the <method 2> minimizes impact applied to a system and a network, cell selection overhead of the MTC device may be increased.

<Method 3: Uses a New Synchronous Signal (PSS/SSS)>

According to another embodiment of the present invention, initial cell selection and/or cell reselection are performed using a new synchronous signal for an MTC device. For example, new PSS/SSS may be defined by changing a sequence of an existing PSS/SSS or a location in a sub-frame. The new synchronous signal for the MTC device transfers information on a system bandwidth whether a system band is a narrowband or a wideband, and is configured so that a normal terminal may detect the new synchronous signal.

When sufficient coverage is ensured without the narrowband cell, only PSS/SSS may be transmitted. That is, a dedicated synchronous signal for the MTC device may be transmitted. However, in a general case, it is preferable that the new PSS/SSS is additionally transmitted. That is, the new PSS/SSS may be transmitted separately from transmission of an existing PSS/SSS.

The MTC device may have a specification lower than that of a normal terminal High overhead is requested to serve the MTC device. Accordingly, to support the MTC device may damage the whole communication system. It is preferable to separately handle the normal terminal and the MTC device. According to the above <method 3>, the cell is divided based on the system bandwidth, overhead of the normal terminal and the MTC device may be reduced. Further, performance reduction of the whole communication system and impact of the normal terminal may be minimized.

Meanwhile, the above <method 3> is applicable to a new carrier type (NCT). The NCT improves an existing carrier, and a type of a carrier omitting a partial reference signal or channel in order to improve an interference problem between a plurality of cells and to improve extension of the carrier. When the narrowband cell is used as a dedicated cell for the MTC device, a corresponding narrowband cell may be set as the NCT, and the new PSS/SSS may be used in a corresponding cell. The MTC device may acquire information on a system band and a type of a carrier from the new PSS/SSS.

Figure 6:
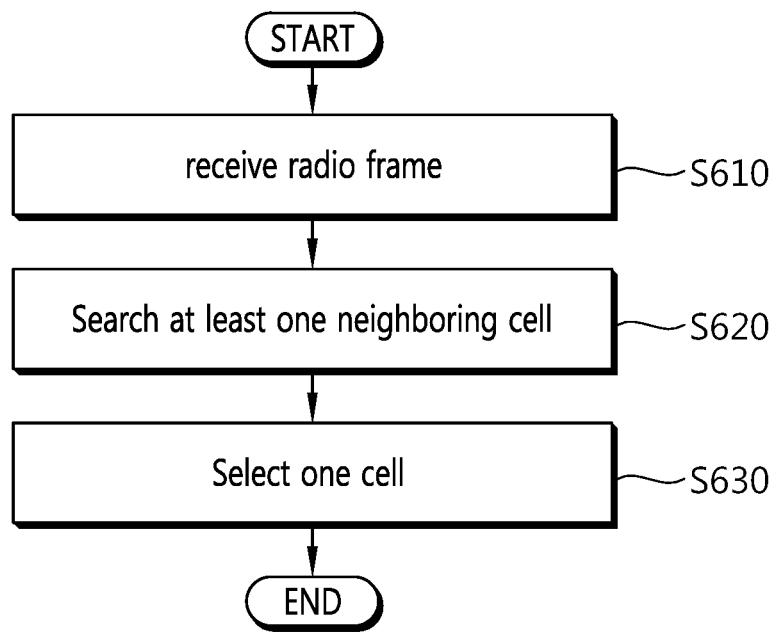
FIG. 6 is a flow chart illustrating a method for cell selection using a new synchronous signal according to an embodiment of the present invention.

Hereinafter, a method for cell search will be described in detail with reference to the <method 3>. FIG. 6 is a flow chart illustrating a method for cell selection using a new synchronous signal according to an embodiment of the present invention.

A terminal receives a radio frame including a first synchronous signal and a second synchronous signal (S610). In this case, the first synchronous signal means a synchronous signal (for example, existing PSS and/or SSS) for the normal terminal. The second synchronous signal means a synchronous signal (for example, new PSS and/or SSS) for the normal terminal. The normal terminal is a terminal supporting a bandwidth of 20 MHz such as an existing terminal. The narrowband terminal is a terminal to support a narrow bandwidth (for example, 1.4 MHz corresponding to 6RB) such as the MTC device.

In other words, a base station supporting the narrowband terminal may transmit the first synchronous signal, the second synchronous signal, and the radio frame including the first and second synchronous signals so that the terminal may receive the first synchronous signal, the second synchronous signal, and the radio frame.

When the first synchronous signal is the existing PSS, a sequence $d1(n)$ of the first synchronous signal is generated based on a ZC (Zadoff-Chu) sequence expressed by a following equation 1.

$$d_{1n}(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases} \quad \text{[Equation 1]}$$

In the equation 1, a ZC root sequence index u is obtained by a following table 1.

TABLE 1

| $V_{ID}^{(2)}$ | Root index u |
|---|---|
| 0 | 25 |
| 1 | 29 |
| 2 | 34 |

When the second synchronous signal is the new PSS, a sequence $d2(n)$ of the second synchronous signal from a ZC sequence as described in the equation 1. However, the ZC root sequence index is fixed to 38.

Meanwhile, the first synchronous signal and the second synchronous signal may be transmitted from a preset sub-frame in the radio frame.

When the first synchronous signal is the PSS, the first synchronous signal may be from a #0 sub-frame (that is, first sub-frame) and a #5 sub-frame (that is, sixth sub-frame). In the above case, the first synchronous signal is transmitted in a period of 5 ms.

Meanwhile, when the second synchronous signal is the new PSS, the second synchronous signal may be transmitted from a sub-frame transmitting the first synchronous signal, but may be transmitted from a next sub-frame. That is, the second synchronous signal may be transmitted from a second sub-frame and a seventh sub-frame.

Alternatively, in order to reduce the damage of the whole system by the MTC, some of ten sub-frames included in the radio frame are set as a sub-frame for the MTC, and the second synchronous signal may be transmitted from a corresponding sub-frame.

For example, a second sub-frame and a seventh sub-frame may be set as a sub-frame for the MTC, and a second synchronous signal may be transmitted from a corresponding sub-frame.

For example, a fourth sub-frame may be set as the sub-frame for the MTC, and the second synchronous signal may be transmitted from the corresponding sub-frame. In this case, the second synchronous signal is transmitted in a period of 10 ms.

The normal terminal performs cell search and selection process based on the first synchronous signal.

Next, the narrowband terminal searches at least one neighboring cell based on the second synchronous signal (S620). For example, the second synchronous signal may transfer information on a system bandwidth. The narrowband terminal may search neighboring cells has the same system bandwidth as a system bandwidth supported from the narrowband terminal.

The narrowband terminal finally selects one from the at least one searched neighboring cell (S630). In this case, the narrowband terminal may select a cell having a strongest signal strength from the at least one neighboring cell. However, so as to reduce power consumption, the narrowband terminal may select a first detected cell from the neighboring cells having a signal strength greater than a predetermined threshold value. The signal strength may be determined based on RSRP and/or RSRQ, and the predetermined threshold value may be determined according to a specification of an RF unit of the narrowband terminal.

Figure 7:
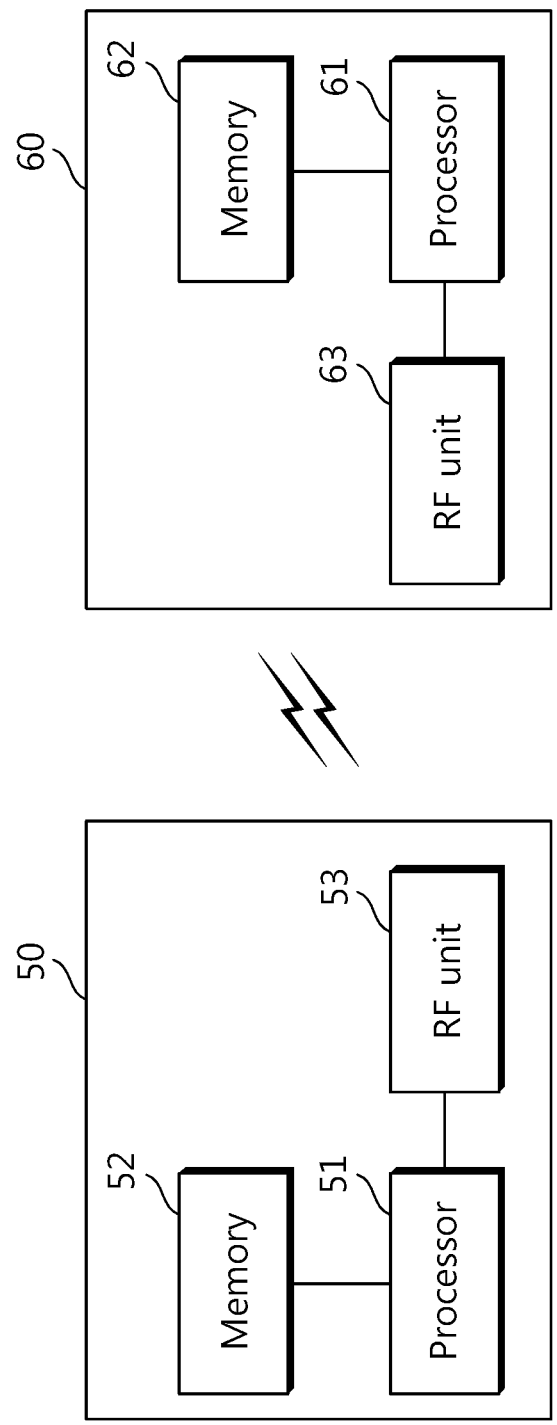
FIG. 7 is a block diagram illustrating a wireless communication system according to the embodiment of the present invention.

FIG. 7 is a block diagram illustrating a wireless communication system according to the embodiment of the present invention.

A BS 50 includes a processor 51, a memory 52 and an RF unit 53. The memory 52 is connected to the processor 51, and stores various information for driving the processor 51. The RF unit 53 is connected to the processor 51, and transmits and/or receives radio signals. The processor 51 implements proposed functions, processes and/or methods. In the above embodiment, an operation of the base station may be implemented by the processor 51. In the embodiment of FIG. 7, the operation of the BS 50 can be implemented by the processor 51.

A UE 60 includes a processor 61, a memory 62 and an RF unit 63. The memory 62 is connected to the processor 61, and stores various information for driving the processor 61. The RF unit 63 is connected to the processor 61, and transmits and/or receives radio signals. The processor 61 implements proposed functions, processes and/or methods. In the embodiment of FIG. 7, the operation of the narrowband terminal, the MTC device, and a terminal operating at a region with limited coverage can be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for cell selection in a wireless communication system, the method comprising:
receiving a radio frame including a first synchronous signal for a user equipment supporting a first bandwidth, and a second synchronous signal for a user equipment supporting a second bandwidth which is narrower than the first bandwidth;
searching at least one neighboring cell on the basis of the second synchronous signal; and
selecting at least one cell from the at least one neighboring cell,
wherein the second synchronous signal is used for machine type communication (MTC).

2. The method of claim 1, wherein the user equipment supporting the second bandwidth comprises a machine type communication (MTC) device.

3. The method of claim 2, wherein the first bandwidth is 20 MHz, and the second bandwidth is 1.4 MHz.

4. The method of claim 1, wherein the second synchronous signal comprises information on the second bandwidth.

5. The method of claim 1, wherein the first synchronous signal is generated from a first Zadoff-Chu (ZC) sequence having a root index of 25, 29, or 34, and the second synchronous signal is generated from a second ZC sequence having a root index of 38.

6. The method of claim 1, wherein the second synchronous signal is received on a second sub-frame and a seventh sub-frame.

7. The method of claim 1, wherein the first synchronous signal is transmitted in a period of 5 ms and the second synchronous signal is transmitted in a period of 10 ms.

8. The method of claim 1, wherein the at least one selected cell has a signal strength greater than a predetermined threshold value among the at least one neighboring cell.

9. A user equipment in a wireless communication system, the user equipment comprising:
a radio frequency (RF) unit configured to transmit and receive a wireless signal; and
a processor connected to the RF unit,
wherein the processor is configured to:
receive a radio frame including a first synchronous signal for a user equipment supporting a first bandwidth, and a second synchronous signal for a user equipment supporting a second bandwidth which is narrower than the first bandwidth,
search at least one neighboring cell on the basis of the second synchronous signal, and
select at least one cell from the at least one neighboring cell,
wherein the second synchronous signal is transmitted from a second sub-frame and a seventh sub-frame in the radio frame.

10. The user equipment of claim 9, wherein the first bandwidth is 20 MHz, and the second bandwidth is 1.4 MHz.

11. The user equipment of claim 9, wherein the second synchronous signal comprises information on the second bandwidth.

12. The user equipment of claim 9, wherein the first synchronous signal is generated from a first Zadoff-Chu (ZC) sequence having a root index of 25, 29, or 34, and the second synchronous signal is generated from a second ZC sequence having a root index of 38.

13. The user equipment of claim 9, wherein the first synchronous signal is transmitted in a period of 5 ms and the second synchronous signal is transmitted in a period of 10 ms.

* * * * *